United States Patent
Li (10) Patent No.: US 11,651,236 B2
(45) Date of Patent: May 16, 2023

(54) METHOD FOR QUESTION-AND-ANSWER SERVICE, QUESTION-AND-ANSWER SERVICE SYSTEM AND STORAGE MEDIUM

(71) Applicant: BOE TECHNOLOGY GROUP CO., LTD., Beijing (CN)

(72) Inventor: Yingjie Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 667 days.

(21) Appl. No.: 16/330,621

(22) PCT Filed: Jun. 28, 2018

(86) PCT No.: PCT/CN2018/093389
§ 371 (c)(1),
(2) Date: Mar. 5, 2019

(87) PCT Pub. No.: WO2019/052261
PCT Pub. Date: Mar. 21, 2019

(65) Prior Publication Data
US 2021/0326714 A1    Oct. 21, 2021

(30) Foreign Application Priority Data
Sep. 18, 2017    (CN) .......................... 201710840615.9

(51) Int. Cl.
*G06N 5/02* (2023.01)
*G06F 16/2457* (2019.01)
(Continued)

(52) U.S. Cl.
CPC .......... *G06N 5/02* (2013.01); *G06F 16/24573* (2019.01); *G06F 40/247* (2020.01); *G06F 40/279* (2020.01); *G06N 3/08* (2013.01)

(58) Field of Classification Search
CPC .......... G06N 5/02; G06N 3/08; G06F 40/279; G06F 40/247; G06F 16/24573
See application file for complete search history.

(56) References Cited

U.S. PATENT DOCUMENTS

2009/0313337 A1    12/2009    Jin et al.
2017/0329754 A1*   11/2017    Beller ................... G06F 16/313

FOREIGN PATENT DOCUMENTS

CN    105005564 A    10/2015
CN    105608218 A    5/2016
(Continued)

OTHER PUBLICATIONS

Chinese Office Action in Chinese Application No. 201710840615.9 dated Jun. 25, 2021, with English translation.
(Continued)

*Primary Examiner* — Kyle R Stork
(74) *Attorney, Agent, or Firm* — Collard & Roe, P.C.

(57) ABSTRACT

A method for question-and-answer service, a question-and-answer service system and a storage medium are disclosed. The method includes: determining a keyword from an initial question group and a corresponding initial answer, the initial question group including at least one initial question; obtaining an associated word group of the keyword, the associated word group of the keyword including at least one associated word of the keyword; and generating an extended question group including at least one extended question by using the associated word group of the keyword.

16 Claims, 3 Drawing Sheets

(51) Int. Cl.
    *G06F 40/279*    (2020.01)
    *G06F 40/247*    (2020.01)
    *G06N 3/08*      (2023.01)

(56) References Cited

FOREIGN PATENT DOCUMENTS

| CN | 105786794 A | 7/2016 |
| CN | 107133303 A | 9/2017 |

OTHER PUBLICATIONS

Extended European Search Report in European Patent Application No. 18852705.5 dated Jun. 2, 2021.
Duan et al., Question Generation for Question Answering, Proceedings of the 2017 Conference on Empirical Methods in Natural Language Processing, Sep. 7-11, 2017, pp. 866-874, Association for Computational Linguistics, Copenhagen, Denmark.
International Search Report of PCT/CN2018/093389 in Chinese, dated Sep. 7, 2018, with English translation.
Notice of Transmittal of the International Search Report of PCT/CN2018/093389 in Chinese, dated Sep. 7, 2018.
Written Opinion of the International Searching Authority of PCT/CN2018/093389 in Chinese, dated Sep. 7, 2018 with English translation.

\* cited by examiner

METHOD FOR QUESTION-AND-ANSWER SERVICE, QUESTION-AND-ANSWER SERVICE SYSTEM AND STORAGE MEDIUM

CROSS-REFERENCE TO RELATED APPLICATION

This application is the National Stage of PCT/CN2018/093389 filed on Jun. 28, 2018, which claims priority under 35 U.S.C. § 119 of Chinese Application No. 201710840615.9 filed on Sep. 18, 2017, the disclosure of which is incorporated by reference.

TECHNICAL FIELD

The embodiments of the present disclosure relate to a method for question-and-answer service, a question-and-answer service system and a storage medium.

BACKGROUND

With development of network technology, data scale, data type and so on are growing rapidly, and people need high-efficient and accurate information retrieval methods, to find and extract the data information content of interest. Therefore, an automatic Question Answering (QA) system develops gradually. The automatic question answering system is a system in which a user interacts with a computer, the user puts forward a question request, and the computer automatically analyzes and processes the question request and returns an answer. At present, the automatic question answering system needs to set up a large number of extended questions in advance, and only in this way can new question requests be accurately analyzed. However, the preset expended questions are mainly set up in advance by means of manual input, which requires a lot of manpower and time, and the efficiency of obtaining data is relatively low.

SUMMARY

At least one embodiment of the present disclosure provides a method for question-and-answer service, which comprises: determining a keyword from a preset question group and a corresponding preset answer, the preset question group comprising at least one preset question; obtaining an associated word group of the keyword, the associated word group comprising at least one associated word of the keyword; and generating an extended question group comprising at least one extended question by using the associated word group of the keyword.

For example, in the method for question-and-answer service provided by at least one embodiment of the present disclosure, determining the key word from the preset question group and the corresponding preset answer comprises: obtaining a question word set comprising at least one candidate keyword from the preset question group, and obtaining an answer word set comprising the at least one candidate keyword from the preset answer; and determining the keyword from the at least one candidate keyword comprised in the question word set according to a first word frequency of each of the at least one candidate keyword in the question word set and a second word frequency of the each of the at least one candidate keyword in the answer word set.

For example, in the method for question-and-answer service provided by at least one embodiment of the present disclosure, determining the keyword from the at least one candidate keyword comprised in the question word set according to a first word frequency of each of the at least one candidate keyword in the question word set and a second word frequency of the each of the at least one candidate keyword in the answer word set comprises: if a first word frequency of a candidate keyword is less than or equal to a first word frequency threshold and a second word frequency of the candidate keyword is greater than or equal to a second word frequency threshold, determining that the candidate keyword is the keyword.

For example, in the method for question-and-answer service provided by at least one embodiment of the present disclosure, obtaining the associated word group of the keyword comprises: obtaining at least one candidate associated word of the keyword from a network; according to a word frequency of each candidate associated word of the at least one candidate associated word in the question word set and a word frequency of the each candidate associated word in the answer word set, determining a third word frequency of the each candidate associated word; and determining the at least one associated word of the keyword from the at least one candidate associated word according to the third word frequency of the each candidate associated word.

For example, in the method for question-and-answer service provided by at least one embodiment of the present disclosure, determining the at least one associated word of the keyword from the at least one candidate associated word according to the third word frequency of the each candidate associated word comprises: determining that candidate associated words having third word frequencies being greater than a third word frequency threshold in the at least one candidate associated word are the at least one associated word of the keyword; or determining top P1 candidate associated words with highest third word frequencies in the at least one candidate associated word to be the at least one associated word of the keyword, P1 being a positive integer; or determining top P2 candidate associated words, third word frequencies of which are greater than the third word frequency threshold, in the at least one candidate associated word to be the at least one associated word of the keyword, the top P2 candidate keywords being top P2 candidate keywords with highest third word frequencies among the at least one candidate keyword, and P2 being a positive integer.

For example, the method for question-and-answer service provided by at least one embodiment of the present disclosure further comprises: extracting first training data and second training data from the preset question group, the preset answer and the extended question group, and setting a similarity between the first training data and the second training data as a target similarity; and training a question-and-answer prediction model according to the first training data, the second training data and the target similarity.

For example, in the method for question-and-answer service provided by at least one embodiment of the present disclosure, when at least one of the first training data and the second training data comprises an extended question in the extended question group, the target similarity is a first similarity threshold; and when the first training data comprises a preset question in the preset question group or the preset answer, and the second training data comprises a preset question in the preset question group or the preset answer, the target similarity is a second similarity threshold; the first similarity threshold is less than the second similarity threshold.

For example, the method for question-and-answer service provided by at least one embodiment of the present disclosure further comprises: receiving a question request; processing the question request by using the question-and-answer prediction model obtained by training, obtaining an answer to the question request; and outputting the answer to the question request.

For example, in the method for question-and-answer service provided by at least one embodiment of the present disclosure, the at least one associated word of the keyword comprises a near-synonym of the keyword.

At least one embodiment of the present disclosure further provides a question-and-answer service system, which comprises a question extension device and an associated word acquisition device. The question extension device is configured to determine a keyword from a preset question group and a corresponding preset answer, the preset question group comprises at least one preset question; the associated word acquisition device is configured to obtain an associated word group of the keyword, the associated word group of the keyword comprises at least one associated word of the keyword; and the question extension device is also configured to generate an extended question group comprising at least one extended question by using the associated word group of the keyword.

For example, in the question-and-answer service system provided by at least one embodiment of the present disclosure, the question extension device is also configured to: obtain a question word set comprising at least one candidate keyword from the preset question group, and obtain an answer word set comprising the at least one candidate keyword from the preset answer; and determine the keyword from the at least one candidate keyword comprised in the question word set according to a first word frequency of each of the at least one candidate keyword in the question word set and a second word frequency of the each of the at least one candidate keyword in the answer word set.

For example, in the question-and-answer service system provided by at least one embodiment of the present disclosure, the question extension device is also configured to determine that a candidate keyword is the keyword in a case where a first word frequency of the candidate keyword is less than or equal to a first word frequency threshold and a second word frequency of the candidate keyword is greater than or equal to a second word frequency threshold.

For example, in the question-and-answer service system provided by at least one embodiment of the present disclosure, the associated word acquisition device is configured to: obtain at least one candidate associated word of the keyword from a network; according to a word frequency of each candidate associated word of the at least one candidate associated word in the question word set and a word frequency of the each candidate associated word in the answer word set, determine a third word frequency of the each candidate association word; and determine the at least one associated word of the keyword from the at least one candidate associated word according to the third word frequency of the each candidate associated word.

For example, in the question-and-answer service system provided by at least one embodiment of the present disclosure, the associated word acquisition device is configured to: determine that candidate associated words having third word frequencies being greater than a third word frequency threshold in the at least one candidate associated word are the associated words of the keyword; or determine top P1 candidate associated words with highest third word frequencies in the at least one candidate associated word to be the associated words of the keyword, P1 being a positive integer; or determine top P2 candidate associated words, third word frequencies of which are greater than the third word frequency threshold, in the at least one candidate associated word to be the associated words of the keyword, the top P2 candidate keywords being top P2 candidate keywords with highest third word frequencies among the at least one candidate keyword, and P2 being a positive integer.

For example, the question-and-answer service system provided by at least one embodiment of the present disclosure further comprises a model training device, and the model training device comprises a question-and-answer prediction model, and the model training device is configured to: extract first training data and second training data from the preset question group, the preset answer and the extended question group, and set a similarity between the first training data and the second training data as a target similarity; and train the question-and-answer prediction model according to the first training data, the second training data and the target similarity.

For example, in the question-and-answer service system provided by at least one embodiment of the present disclosure, when at least one of the first training data and the second training data comprises an extended question in the extended question group, the target similarity is a first similarity threshold; when the first training data comprises a preset question in the preset question group or the preset answer, and the second training data comprises a preset question in the preset question group or the preset answer, the target similarity is a second similarity threshold; and the first similarity threshold is less than the second similarity threshold.

For example, the question-and-answer service system provided by at least one embodiment of the present disclosure further comprises a question-and-answer service device, the question-and-answer service device is configured to receive a question request; the model training device is configured to process the question request by using the question-and-answer prediction model obtained by training, so as to obtain an answer to the question request; the question-and-answer service device is also configured to output the answer to the question request.

For example, in the question-and-answer service system provided by at least one embodiment of the present disclosure, the at least one associated word of the keyword comprises a near-synonym of the keyword.

At least one embodiment of the present disclosure further provides a storage medium, storing computer instructions which are adapted to be executed by a processor, and when the computer instructions are executed by the processor, the method for question-and-answer service according to any one of the above can be performed.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the absolute position of the object which is described is changed, the relative position relationship may be changed accordingly.

In order to make the following description of the embodiments of the present disclosure clear and concise, the present disclosure omits detailed description of known functions and known components.

With development of network technology and enhancement of computing power, interactive modes between terminal devices and users are becoming more and more intelligent. At present, an automatic question-and-answer system based on natural language processing can interact with users through an intelligent terminal or a web service. The automatic question-and-answer system is an intelligent natural language processing system which integrates many technologies such as computer linguistics, information science, artificial intelligence, and etc. into a body. The automatic question-and-answer system allows the users to query information in a form of natural language, and provides accurate and concise answers to the users. For example, the automatic question-and-answer system can be applied to after-sales service or customer service of the internet industry, so as to achieve automatic and real-time feedback to the user's consultation.

With development of deep learning technology and improvement of hardware speed, users can build and train an automatic question-and-answer system by themselves based on the deep learning technology. In the training processing, data amount to be trained becomes a key factor. If the data amount to be trained is large, then the automatic question-and-answer system is more accurate and intelligent. The data amount to be trained may come from community question-and-answer, social networking and so on. In addition to purchasing the data amount to be trained, the users obtain the data amount to be trained mainly by means of manual input, so that the efficiency of acquiring the data amount is low, and the amount of data acquired is also limited.

At least one embodiment of the present disclosure provides a method for question-and-answer service, a question-and-answer service system and a storage medium. The method for question-and-answer service includes: determining a keyword from a preset question group and a corresponding preset answer, the preset question group including at least one preset question; obtaining an associated word group of the keyword, the associated word group of the keyword including at least one associated word of the keyword; and generating an extended question group including at least one extended question by using the associated word group of the keyword.

The method for question-and-answer service provided by an embodiment of the present disclosure automatically acquires an associated word group related to a keyword according to the keyword, and automatically generates an extended question group by using the associated word group of the keyword, thereby improving the efficiency of data acquisition, reducing a cost of data acquisition, increasing knowledge coverage, and saving manual workloads.

The embodiments of the present disclosure are described in detail below with reference to the accompanying drawings, however the present disclosure is not limited to these specific embodiments.

Figure 1:
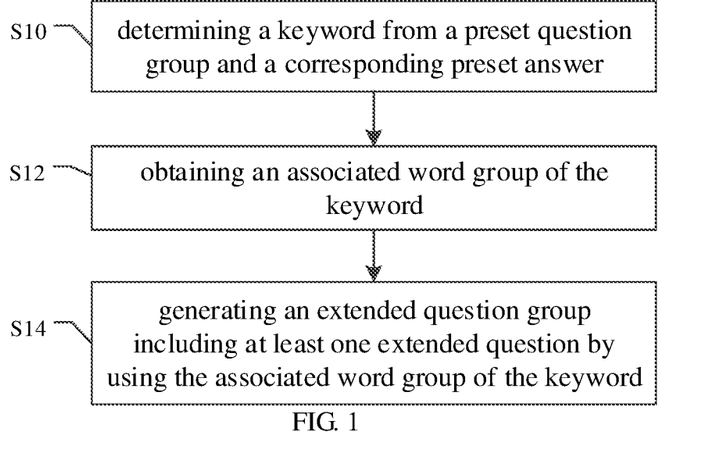
FIG. 1 is a schematic flowchart of a method for question-and-answer service provided by an embodiment of the present disclosure.
Figure 2:
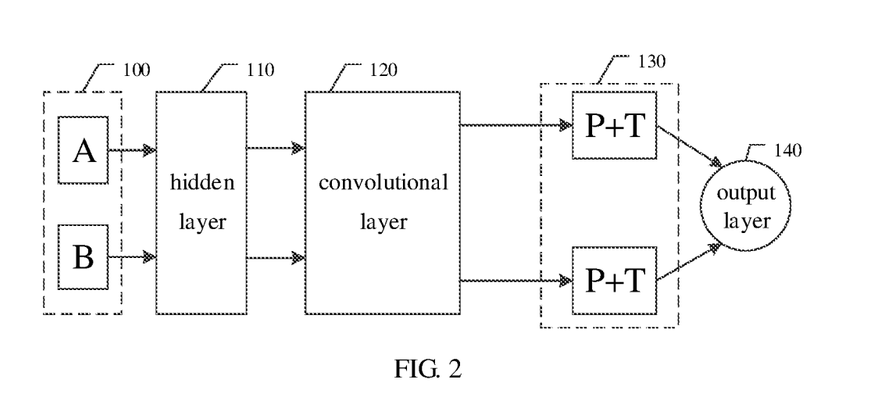
FIG. 2 is a schematic diagram of a deep neural network provided by an embodiment of the present disclosure.

FIG. 1 is a schematic flowchart of a method for question-and-answer service provided by an embodiment of the present disclosure, and FIG. 2 is a schematic diagram of a deep neural network.

For example, as shown in FIG. 1, the method for question-and-answer service provided by the embodiment of the present disclosure includes following operations:

S10: determining a keyword from a preset question group and a corresponding preset answer;

S12: obtaining an associated word group of the keyword;

S14: generating an extended question group including at least one extended question by using the associated word group of the keyword.

Figure 5:
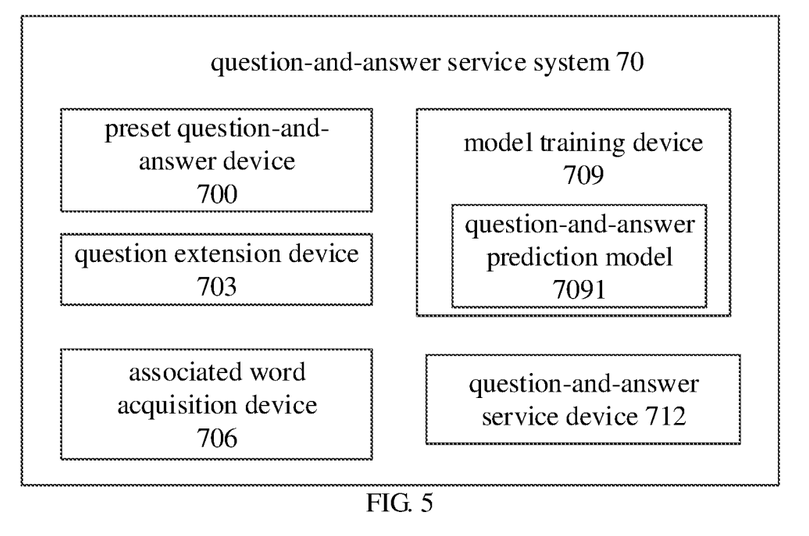
FIG. 5 is a schematic block diagram of a question-and-answer service system provided by an embodiment of the present disclosure.

It should be noted that: the above operations S10-S30 can all be performed by the machine instead of being performing manually, thereby improving the automaticity of acquiring the extended question group and saving manual workloads. For example, in the operation S10, the step of determining a keyword can be performed by using a question extension device 703 in the question-and-answer service system which will be described below. In addition, the extended question obtained in the method for question-and-answer service provided by the embodiment of the present disclosure may be used in the process of the question-and-answer service.

For example, preset questions in the preset question group and a corresponding preset answer can be extracted from a corpus. The corpus may include structured data, and may also include unstructured data.

For example, a natural language processing (NLP) technology can be used to extract the preset question group and the corresponding preset answer(s) from the corpus. Natural language processing may include syntactic analysis, word segmentation, lexical analysis, semantic analysis, text recognition and other language processing techniques. For example, as regards the natural language processing, a deep learning neural network or other methods may be used for performing the natural language processing. The correlation between the selected preset question group and the preset answer can be improved by using the deep learning neural network to process data in the corpus. For example, the deep learning neural network may include a recurrent neural network (RNN), a recursive neural network (RNN) and other neural networks. The deep learning neural network can analyze and process the natural language by using one of the above neural networks or a combination of several of the above neural networks.

For example, the corpus may include a collection of various types of knowledge, and the preset question group may be a question group of diverse types. For example, the corpus may be a separate collection of different types of knowledge, such as a collection of medical knowledge, a collection of literature knowledge, a collection of physics knowledge, a collection of daily life knowledge, a collection of financial knowledge, and so on. Accordingly, the preset question group may be a medical-type question group, a literature-type question group, a physics-type question group, a daily-life-type question group, a financial-type question group, or the like. For another example, the corpus may also be a mixed collection of various different knowledge (for example, physics, literature, mathematics, etc.).

For example, the corpus may include a variety of knowledge from different sources. The sources of various knowledge may be textbooks, websites, papers, literary works, and so on. For example, when the corpus is a collection of medical knowledge, the source of medical knowledge may be a medical website, a medical paper, a medical textbook, a medical record, and the like.

For example, the preset question group and the preset answer that are extracted from the corpus may be stored in a database. For example, according to the type of preset question group, the database may be a medical-type database, a literature-type database, a physics-type database, a daily-life-type database, a financial-type database, and so on.

For example, the preset question group and the preset answer may be stored in a database in a form of text. Preset questions of the preset question group and the preset answer may have corresponding storage areas and corresponding storage addresses. For another example, the preset question group and the preset answer may also be stored in a database in other form (for example, the preset question group and the corresponding preset answer thereof are stored in a database in tables, lists, charts, or other forms). The preset questions of the preset question group and the preset answer may also be stored in a form of voice or the like.

For example, in operation S10, the preset question group includes at least one preset question. For example, the preset question may include a standard question and/or a preset extended question. For example, one or more preset questions may be extracted from the corpus to constitute the preset question group, and the one or more preset questions express the same semantics. One preset question is selected from the one or more preset questions as the standard question, and the remaining preset questions are used as preset extended questions. The preset extended questions are different expression forms of the standard question. For example, the number of the preset extended questions may be 5, 10, 20, or the like. The present disclosure does not limit the specific number of the preset extended questions in the preset question group.

It should be noted that, the standard question and the preset extended questions may adopt either semantic expression forms or specific question sentence expression forms. The embodiments of the present disclosure are not limited thereto.

For example, in descriptions of the present disclosure, the method for question-and-answer service provided by an embodiment of the present disclosure will be described in detail by taking a case where the preset question group is a daily-life-type question group (e.g., asking about price, etc.) as an example. However, those skilled in the art should know that the preset question group may also be a question group of other type.

For example, asking about the price of a book can be expressed in a variety of forms. The expression forms of asking about the price may include "how much is this book", "what is the price of this book", "how much is this book worth", "how much it costs to buy this book", etc. The above-mentioned several expression forms of asking about the price may be used as a plurality of preset questions in the preset question group. One of the plurality of preset questions is selected as the standard question, and the remaining preset questions are used as the preset expended questions. For example, in an example, the standard question may be "how much is this book", and the preset expended questions may be "what is the price of this book", "how much is this book worth" and "how much it costs to buy this book". But the present disclosure is not limited thereto. For another example, the standard question may also be "how much is this book worth", and the remaining expression forms of asking about the price are the preset expended questions. The embodiments of the present disclosure do not limit the manner in which the standard question and the preset extended questions are divided.

For example, the preset answer is an answer to all preset questions in a preset question group. For example, the preset answer may be an answer corresponding to a standard question. The preset answer may have various expression forms. For example, for the preset question group mentioned above, the expression forms the corresponding preset answers may include "the price of this book is 100 yuan", " this book is worth 100 yuan", and so on. For example, all expression forms of the preset answer may be stored in a database, or only one or several preset answers can be stored in the database.

For example, operation S10 may include following operations:

S101: obtaining a question word set including at least one candidate keyword from the preset question group, and obtaining an answer word set including the at least one candidate keyword from the preset answer;

S102: determining the keyword from the at least one candidate keyword included in the question word set according to a first word frequency of each candidate keyword in the question word set and a second word frequency of each candidate keyword in the answer word set.

For example, operation S101 may include performing a word segmentation processing on the preset question group to obtain a question word-segmentation group, and performing the word segmentation processing on the preset answer to obtain an answer word-segmentation group; and processing the answer word-segmentation group to obtain the answer word set, and processing the question word-segmentation group to obtain the question word set.

For example, in the operation S101, processing the question word-segmentation group may include performing a stop-word removal processing on the question word-segmentation group, so as to form the question word set. Processing the answer word-segmentation group may include performing a stop-word removal processing on the answer word-segmentation group, so as to form the answer word set.

For example, the question word-segmentation group may include at least one question word and at least one stop-word, and the answer word-segmentation group may include at least one answer word and at least one stop-word. The question word set may include the at least one question word in the question word-segmentation group, and the answer word set may include the at least one answer word in the answer word-segmentation group. For example, in an example, the preset question is "how much money is this book", and after the word segmentation processing is performed on the preset question, the question word-segmentation group may include "this" "book", "how much" and "money". For example, "book" and "money" are question words, while "this" and "how much" are stop-words. After the stop-word removal processing is performed on the question word-segmentation group, the question word set includes "book" and "money".

For example, the candidate keyword is a question word selected from the question word set. All question words in the question word set may be candidate keywords.

For example, the word segmentation processing performs word segmentation mainly according to certain word segmentation rules. In the operation S101, the natural language processing technique may be used to perform the word segmentation processing on the preset question group and the preset answer, to obtain the question word-segmentation group and the answer word-segmentation group. For example, the word segmentation processing can use a forward maximum matching method, a reverse maximum matching method, a minimum segmentation method, a word-by-word traversal method, a word frequency statistics method, a bidirectional maximum matching method or other appropriate algorithms. For example, the word segmentation processing can achieve word segmentation by using jieba (Chinese for "to stutter") word segmentation, Pangu word segmentation, HTTPCWS word segmentation, Pao Ding Jie Niu word segmentation, and other open-source word segmentation tools.

For example, the stop-word removal processing is mainly used to remove stop-words, thereby improving the accuracy of the obtained keywords. The stop-words may include modal particles, adverbs, prepositions, conjunctions, etc. For example, the stop-words may be "of", "ma", "me", "how many", "where", "what", "this", and other words, and these words do not contain key information of a question, but may appear relatively frequently in the question word-segmentation group and answer word-segmentation group. When performing the stop-word removal processing, a stop-word list can be created in advance, and then each entry in the question word-segmentation group and the answer word-segmentation group is matched with each stop-word in the stop-word list, if the stop-word list includes the entry, then the entry is deleted.

It should be noted that, in the process of word segmentation, the word segmentation processing can be performed on various expression forms of the preset answer separately, so as to form a plurality of answer word sets, one answer word set corresponds to one expression form of the preset answer. The second word frequency represents the maximum word frequency of a candidate keyword in the plurality of answer word sets. The word segmentation processing can be performed on all the preset questions in the preset question group, or alternatively, the word segmentation processing also can be performed on one or several preset questions in the preset question group, so as to form the question word set.

For example, operation S102 may include that determining a first word frequency of a candidate keyword in the question word set and a second frequency of the candidate keyword in the answer word set; and if the first word frequency of the candidate keyword is less than or equal to a first word frequency threshold and the second word frequency of the candidate keyword is greater than or equal to a second word frequency threshold, determining that the candidate keyword is a keyword.

For example, the first word frequency indicates a ratio of the number of times a candidate keyword appearing in the question word set to the number of all question words in the question word set. The second word frequency represents a ratio of the number of times a candidate keyword appearing in the answer word set to the number of all answer words in the answer word set.

For example, the first word frequency threshold and the second word frequency threshold may be the same, and may also be different. The first word frequency threshold, for example, may be 20%. The second word frequency threshold may be 30%, but the first word frequency threshold and the second word frequency are not limited thereto. The first word frequency threshold and the second word frequency threshold, for example, may be preset by a user or automatically set by a system.

For example, a keyword represents key information in a preset question group. In the preset question group, each preset question can represent the key information in different expression forms, therefore the first word frequency of the keyword is relatively small. The preset answer is mainly to answer the key information, and therefore, the keyword appears more frequently in the preset answer, and the second word frequency of the keyword is relatively large.

For example, a question word set may include one keyword or a plurality of keywords. The keyword may be a single-morpheme word formed by one morpheme, or a compound word formed by a combination of a plurality of morphemes.

For example, in operation S102, in a case of determining that the first word frequency is greater than the first word frequency threshold and/or determining that the second word frequency is less than the second word frequency threshold, the candidate keyword is determined as a non-keyword, and a next question word is selected from the question word set for processing.

For example, in an example, operation S12 may include following operations:

S120: obtaining at least one candidate associated word of the keyword from a network;

S121: according to a word frequency of each candidate associated word of the at least one candidate associated word in the question word set and a word frequency of each candidate associated word in the answer word set, determining a third word frequency of each candidate associated word; and S122: determining associated words of the keyword from the at least one candidate associated word according to the third word frequency of each candidate associated word.

For example, operation S120 may include obtaining relevant information of the keyword from the network, and word-segmenting the relevant information of the keyword to obtain the at least one candidate associated word of the keyword.

For example, in an example, in the operation S120, at least one candidate associated word for the keyword may be obtained from the network by using a web crawler.

For example, web crawlers are programs or scripts that automatically grab World Wide Web information according to certain rules, they are widely used in internet search engines or other similar websites, and can automatically collect contents of all pages to which they can access, so as to obtain or update contents and retrieval methods of these websites. A web crawler system mainly consists of three parts, i.e. a controller, a parser and a resource library. The controller is mainly used to assign work tasks to respective crawler threads in multi-thread. The parser is mainly used for downloading web pages and processing text of the web pages. For example, main functions of the parser include information filtering, extraction of special tags (for example, JS script tags, CSS code contents, space characters, HTML tags), data analysis and so on. The basic work of a web crawler is accomplished by the parser. The resource library is used to store data downloaded from web pages, and to provide a target source for generating an index. A large-scale database (such as Oracle database, Sql Server database, etc.) may be used as the resource library for data storage.

For example, in the operation S120, the web crawler can obtain two kinds of relevant information about the keyword. The first relevant information of the keyword is the near-synonym, which may be directly obtained through an Application Programming Interface (API) provided by a semantic web, a word forest network, or the like, and may also be obtained from a service terminal of a near-synonym database established by the users themselves. The second relevant information of the keyword may be the text information that is obtained by search engines, community forums and so on and is associated with the keyword.

For example, for keywords in preset question groups of different types, web crawlers can obtain relevant information of the keywords from different types of network sources, thus improving the accuracy of obtained relevant information of the keywords. For example, if a preset question group is an astronomical question group, then the network source may be a popular astronomical science website or the like.

For example, in the operation S120, a word segmentation processing and a stop-word removal processing are performed on the relevant information of the keyword, so as to obtain at least one candidate associated word of the keyword. it should be noted that if the relevant information of the keyword is the near-synonym, then the word segmentation processing and the stop-word removal processing do not need to be performed on the near-synonym, and the near-synonym is directly judged as an associated word.

For example, in an example of operation S121, the third word frequency of a candidate keyword may be a sum of a word frequency of the candidate keyword in the question word set and a word frequency of the candidate keyword in answer word set. The word frequency of the candidate keyword in the question word set can represent a ratio of the number of times the candidate associated word appearing in the question word set to the number of all question words in the question word set; and the word frequency of the candidate keyword in the answer word set can represent a ratio of the number of times the candidate associated word appearing in the answer word set to the number of all answer words in the answer word set.

For example, in another example of operation S121, the third word frequency of the candidate keyword may be a word frequency of the candidate associated word in a collection of the question word set and the answer word set. For example, the third word frequency represents a ratio of the number of times the candidate associated word appearing in the collection of the question word set and the answer word set to the number of all words in the collection of the question word set and the answer word set.

For example, in an example, operation S122 may include determining that candidate associated words having third word frequencies being greater than a third word frequency threshold in the at least one candidate associated word are the associated words of the keyword.

For example, in another example, operation S122 may include determining top P1 candidate associated words with highest third word frequencies in the at least one candidate associated word to be the associated words of the keyword. For example, P1 is a positive integer.

For example, P1 may be related to a number M of candidate associated words, and a relationship between P1 and M may be set in advance. For example, P1=INT (0.7 m), INT (x) represents the largest integer not exceeding the real number x.

For example, in still another example, operation S122 may include determining top P2 candidate associated words, third word frequencies of which are greater than the third word frequency threshold, in the at least one candidate associated word to be the associated words of the keyword. For example, the top P2 candidate keywords are top P2 candidate keywords with highest third word frequencies among all candidate associated words whose third word frequencies are greater than the third word frequency threshold, and P2 is a positive integer.

For example, a number of candidate associated words with third word frequency being greater than the third word frequency threshold in the at least one candidate associated word may be N. P2 may be correlated with N, and a relationship between P2 and N can be set in advance. For example, P2=INT (0.5N).

It should be noted that, the above descriptions of P1 and P2 are only exemplary, and a value of P1 and a value of P2 are not specifically limited in the embodiments of the present disclosure.

For example, in a case of determining that a candidate associated word is an associated word of the keyword, an association relationship between the associated word and the keyword can be established. An associated word group may include a keyword, an associated word, and an association relationship between the associated word and the keyword. The association relationship may represent a mapping relationship between the associated word and the keyword in a database, so that when the keyword is obtained, the associated word of the keyword can be obtained according to the keyword. The association relationship between associated words and keywords may be multiple-to-one, that is, a plurality of associated words correspond to one keyword.

For example, associated words of a keyword may be near-synonyms, synonyms of the keyword, and so on.

For example, the third word frequency threshold may be set by an user in advance or be automatically set by the system. For example, in an example, the third word frequency threshold is 35%.

It should be noted that, in operation S12, the associated words may also be obtained by a manual entry method.

For example, operation S14 may include following operations: replacing the keyword in the preset question group with associated words of the keyword, so as to generate an extended question group including at least one extended question.

For example, the extended question group may also be stored in the database.

Figure 3:
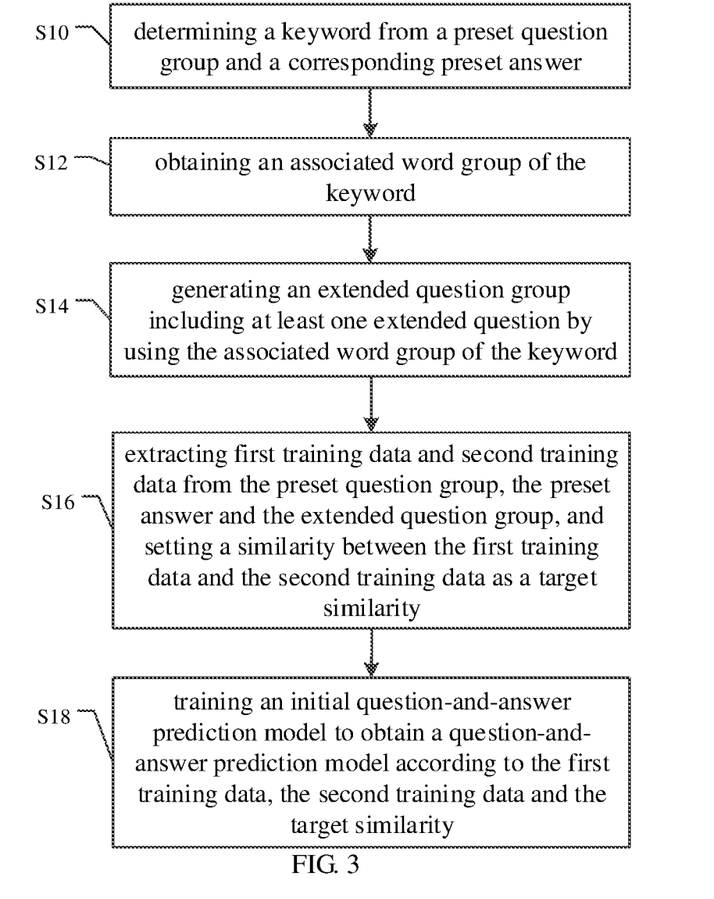
FIG. 3 is a schematic flowchart of another method for question-and-answer service provided by an embodiment of the present disclosure.

FIG. 3 is a schematic flowchart of another method for question-and-answer service provided by an embodiment of the present disclosure.

For example, as shown in FIG. 3, the method for question-and-answer service further includes:

S16: extracting first training data and second training data from the preset question group, the preset answer and the extended question group, and setting a similarity between the first training data and the second training data as a target similarity;

S18: training an initial question-and-answer prediction model to obtain a question-and-answer prediction model according to the first training data, the second training data and the target similarity.

For example, operation S18 may include: processing the first training data and the second training data by using the initial question-and-answer prediction model to obtain a predictive similarity; and comparing the predictive similarity and the target similarity, modifying parameters of the initial question-and-answer prediction model according to the a comparison result, so as to obtain the trained question-and-answer prediction model.

For example, initial parameters of the initial question-and-answer prediction model may be random numbers. The random numbers, for example, conform to a Gaussian distribution. It should be noted that: the operation of training the question-and-answer prediction model is performed by a machine. For example, the process of training the question-and-answer prediction model can be performed by the model training device 709 in the question-and-answer service system provided below.

It should be noted that, operation 18 includes repeatedly iteratively training the initial question-and-answer prediction model by using the first training data and the second training data, and ending the training until a loss function of the initial question-and-answer prediction model satisfies a predetermined condition. The initial question-and-answer prediction model differs from the question-and-answer prediction model only in parameters, and a structures of the initial question-and-answer prediction model and a structure of the question-and-answer prediction model are the same.

For example, the question-and-answer prediction model may include a deep neural network model. Tensorflow, a Convolutional Architecture for Fast Feature Embedding (CAFFE) or the like may be used as a deep learning framework. The deep neural network model can use a convolution neural network (CNN), a stack self-coding network, a sparse coding network, a recurrent neural network (RNN), a deep belief network, a long-short-term memory network or the like. In the example shown in FIG. 2, descriptions will be given in detail by taking a CNN model as an example.

For example, as shown in FIG. 2, a CNN model includes an input layer 100, a hidden layer 110, a convolutional layer 120, a sub-sampling layer 130, an output layer 140, and the like.

For example, during a training process, the input layer 100 is used to input the first training data and the second training data. For example, data A in the input layer 100 represents the first training data, and data B represents the second training data.

For example, when at least one of the first training data and the second training data includes an extended question in the extended question group, the target similarity is a first similarity threshold in this case. For example, the first training data and the second training data may both be extended questions in the extended question group; or, the first training data may be an extended question in the extended question group, while the second training data is a preset answer; alternatively, the first training data may be an extended question in the extended question group, while the second training data is a preset question in the preset question group. For another example, when the first training data may include a preset question in the preset question group or a preset answer, and the second training data may include a preset question in the preset question group or the preset answer, the target similarity is a second similarity threshold in this case. For example, the first training data and the second training data may both be preset questions in the preset question group; or, the first training data may be a preset question in the preset question group, while the second training data is the preset answer.

For example, the first similarity threshold is less than the second similarity threshold. In a process of question-and-answer service, when the question-and-answer prediction model has processed a question request, an output answer to the question request corresponds to the maximum similarity obtained by calculation. In a process of training the question-and-answer prediction model, because the first similarity threshold is less than the second similarity threshold, when the question-and-answer prediction model processes a question request, a similarity between the question request and a preset question is greater than a similarity between the question request and an extended question. Therefore, in the process of question-and-answer service, preset questions in the preset question group can be adopted preferentially, so as to improve the accuracy of output answers.

For example, in an example, the first similarity threshold may be 0.8, and the second similarity threshold may be 1.

For example, when the first training data and the second training data are both extended questions in the extended question group, the first similarity threshold is X1; when the first training data is an extended question in the extended question group and the second training data is the preset answer, the first similarity threshold is X2; when the first training data is an extended question in the extended question group and the second training data is a preset question in the preset question group, the first similarity threshold is X3. When the first training data and the second training data both are preset questions in the preset question group, the second similarity threshold may be Y1; when the first training data is a preset question in the preset question group and the second training data is the preset answer, the second similarity threshold may be Y2. For example, X1, X2 and X3 may be the same, and may also be different, but each of X1, X2 and X3 is less than the second similarity threshold, that is, any one of X1, X2 and X3 is less than any one of Y1 and Y2. Y1 and Y2 may be the same, and may also be different, but each of Y1 and Y2 is larger than the first similarity threshold, that is, any one of Y1 and Y2 is larger than any one of X1, X2 and X3.

For example, the convolutional layer 120 is used for performing convolution process on the training data. The convolutional layer 120 has weights and biases. A weight represents a convolution kernel, and a bias is a scalar superimposed on an output of the convolutional layer 120. Typically, each convolutional layer 120 includes dozens or hundreds of convolution kernels. For example, each CNN includes a plurality of convolutional layers 120. If the CNN is a deep convolution neural network, then it includes at least five convolutional layers 120.

For example, parameters of the question-and-answer prediction model may include weights and biases of the convolutional layer 120.

For example, the sub-sampling layer 130 is used for performing a sub-sampling process on an output of the convolutional layer 120. In the sub-sampling layer 130, T represents an activation function, and P means pooling, that is, sub-sampling.

For example, sub-sampling is mainly used to reduce the size of the quantity, simplify the computational complexity, and reduce the phenomenon of over-fitting to a certain extent. There are many methods to implement sub-sampling, and the methods include but are not limited to: max-pooling, avg-pooling, random merging, under-sampling (decimation, for example, selecting fixed pixels), demultiplexing output (demuxout, for splitting an input image into a plurality of smaller images), etc.

For example, the activation function is used to introduce nonlinear factors into CNN, so that CNN can better solve more complex problems. The activation function includes a rectified linear unit (ReLU) function, an S-type function (Sigmoid function), a hyperbolic tangent function (tanh function) or the like. The ReLU function is an unsaturated nonlinear function, and the Sigmoid function and tanh function are saturated nonlinear functions.

For example, the output layer 140 is used to determine a similarity between input data A and data B. During the training process, the data A is the first training data and the data B is the second training data, that is, the output layer 140 is used to calculate a similarity between the first training data and the second training data. For example, a distance between the data A and the data B can be calculated by methods such as Cosine Similarity (also called as cosine distance), Euclidean distance, Mahalanobia distance and the like. The smaller the distance is, the higher the similarity between the data A and the data B is.

Figure 4:
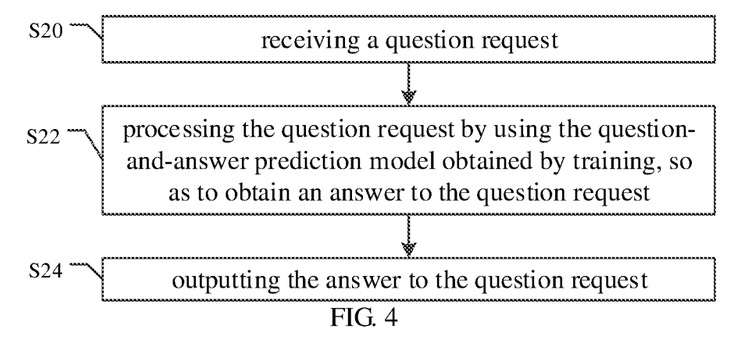
FIG. 4 is a flowchart of a question-and-answer process of a method for question-and-answer service provided by an embodiment of the present disclosure.

FIG. 4 is a flowchart of a question-and-answer process of a method for question-and-answer service provided by an embodiment of the present disclosure.

For example, as shown in FIG. 4, a question-and-answer process of a method for question-and-answer service includes:

S20: receiving a question request;

S22: processing the question request by using the question-and-answer prediction model obtained by training, so as to obtain an answer to the question request;

S24: outputting the answer to the question request.

For example, in the operation S20, a server side can obtain a question request from a client side via network, and meanwhile, the server side also can return an answer to the question request to the client side via the network. A process of requesting and responding can be performed between the server side and the client side through network protocols. For example, the client side is an end user and the server side is a website. Here, the network protocols are not limited to a HyperText Transfer protocol (HTTP), but can be any other network communication protocols, such as a file transfer protocol (FTP), a transmission control protocols/internet interconnection protocol (TCP/IP), an interior gateway protocol (IGP), etc.

For example, the question request and the answer to the question request can be encapsulated by a data format such as a string, an eXtensible Markup Language (xml), JS object notation (JavaScript Object Notation, JSON) or the like.

For example, in the operation S20, the server side can also obtain a question request from an input device. The input device may include, for example, a keyboard, a remote control, a touch screen with a touch function, a microphone, or the like. For example, the question request may be text information input through a keyboard, a touch screen or the like; and the question request may also be voice information input through a microphone or the like, and the voice information can be converted into text information after being processed by a voice recognition system.

For example, the operation S22 may include: calculating a similarity between the question request and each preset question in the preset question group of various types, and each extended question in the extended question group of various types separately by using a question-and-answer prediction model obtained by training; selecting a preset question or an extended question with the highest similarity; and obtaining an preset answer corresponding to the preset question or the extended question with the highest similarity as a target answer. The answer to the question request is the target answer.

For example, as shown in FIG. 2, during a question-and-answer process, an A input into the input layer 100 of the question-and-answer prediction model obtained by training may represent a question request, and a B represents a preset question or an extended question. The output layer 140 of the question-and-answer prediction model obtained by training may be used to determine a similarity between the question request and the preset question or the extended question.

It should be noted that, in the operation S22, the question-and-answer prediction model can also be used to calculate a similarity between a question request and a preset answer of diverse types.

For example, in the operation S24, an answer to the question request may be output by an output device. The output device may be a display, a loudspeaker, etc. If the output device is a display, the answer to the question request may be outputted by means of text, image, video and the like; if the output device is a loudspeaker, the answer to the question request may be outputted by means of voice.

For example, a client-side user may interact with the server side via a user interface. The user interface may include a graphical user interface, a natural user interface, and so on. For example, the graphical user interface can accepts an input from a user by using an input device such as a keyboard, a mouse, remote control, or the like, and provide an output on an output device such as a display or the like. The natural user interface enables a user to interact with the server side by means of voice recognition, touch and stylus recognition, gesture recognition on and near a screen, machine intelligence and the like.

FIG. 5 is a schematic block diagram of a question-and-answer service system provided by an embodiment of the present disclosure.

For example as shown in FIG. 5, a question-and-answer service system 70 provided by an embodiment of the present disclosure may include a preset question-and-answer device 700, a question extension device 703 and an associated word acquisition device 706. It should be noted that, components of the question-and-answer service system 70 shown in FIG. 5 are only exemplary but are not restrictive, and according to practical application needs, the question-and-answer service system 70 may also have other components.

For example, the preset question-and-answer device 700 may include one or more memories. The memories are used to store various types of preset question groups and corresponding preset answers. For example, a memory can include a volatile memory and/or a non-volatile memory. The volatile memory may include, for example, a random access memory (RAM) and/or a cache or the like. The non-volatile memory may include, for example, a read only memory (ROM), a hard disk, an erasable programmable read only memory (EPROM), a portable compact disc-read only memory (CD-ROM), a USB memory, a flash memory, and the like.

For example, the question extension device 703 is configured to determine a keyword from a preset question group and a corresponding preset answer, and to transmit the keyword to the associated word acquisition device 706. The associated word acquisition device 706 is configured to obtain an associated word group of the keyword and transmit the associated word group to the question extension device 703. The question extension device 703 is also configured to generate an extended question group including at least one extended question by using the associated word group of the keyword.

For example, the preset question group includes at least one preset question. The at least one preset question may include one standard question and one or more preset extended questions. For example, the preset answer may correspond to the standard question.

For example, the associated word group of the keyword includes at least one associated word of the keyword.

For example, the question extension device 703 and the associated word acquisition device 706 may communicate through a network. For example, the network may include a wireless network, a wired network, and/or any combination of a wireless network and a wired network. The network may include a local area network, the Internet, a telecommunications network, Internet of Things based on the Internet and/or a telecommunication network, and/or any combination of the above networks, and the like. The wired network, for example, may communicate by means such as a twisted pair, digital subscriber lines(DSL), coaxial cables, optical fiber transmission or the like, and the wireless network, for example, may communicate by means such as 3G/4G/5G mobile communication networks, Bluetooth, Zigbee, or WiFi. For another example, the question extension device 703 and the associated word acquisition device 706 can also communicate via a system bus. The embodiments of the present disclosure are not limited thereto.

For example, the question extension device 703 and the associated word acquisition device 706 may be implemented by hardware, software, firmware, or any combination thereof.

For example, the memory in the preset question-and-answer device 700 may also be used to store associated word groups, extended question groups, etc.

For example, the question-and-answer service system 70 may further include a controller (not shown). The controller is used to control respective components in the question-and-answer service system 70 to work cooperatively. The controller may be a combinational logic controller, a microprogram controller, etc.

For example, in an example, the question extension device 703 is configured to obtain a question word set including at least one candidate keyword from the preset question group, and obtain an answer word set including the at least one candidate keyword from the preset answer; and determine the keyword from the at least one candidate keyword included in the question word set according to a first word frequency of each of the at least one candidate keyword in the question word set and a second word frequency of each of the at least one candidate keyword in the answer word set.

For example, the question extension device 703 and the associated word acquisition device 706 may access the preset question-and-answer device 700 through a system bus, so as to obtain a preset question group, a preset answer, an extended question group, and other data.

For example, the question extension device 703 is also configured to determine a first word frequency of a candidate keyword in the question word set and a second word frequency of the candidate keyword in the answer word set; and determine that the candidate keyword is the keyword in a case where the first word frequency of the candidate keyword is less than or equal to a first word frequency threshold and the second word frequency of the candidate keyword is greater than or equal to a second word frequency threshold.

For example, in an example, the associated word acquisition device 706 is also configured to obtain at least one candidate associated word of the keyword from a network; according to a word frequency of each candidate associated word of the at least one candidate associated word in the question word set and a word frequency of each candidate associated word in the answer word set, determine a third word frequency of each candidate association word; and determine associated words of the keyword from the at least one candidate associated word according to the third word frequency of each candidate associated word.

For example, in an example, the associated word acquisition device 706 is also configured, for example, to obtain the at least one candidate associated word of the keyword from the network by using a web crawler.

For example, the third word frequency may be a sum of a word frequency of the candidate associated word in the question word set and a word frequency of the candidate associated in the answer word set.

For example, in an example, the associated word acquisition device 706 is configured to determine candidate associated words, third word frequencies of which are greater than a third word frequency threshold, in the at least one candidate associated word to be the associated words of the keyword.

For example, in another example, the associated word acquisition device 706 is configured to determine top P1 candidate associated words with highest word frequencies in the at least one candidate associated word to be the associated words of the keyword. For example, P is a positive integer.

For example, in another example, the associated word acquisition device 706 is configured to determine top P2 candidate associated words, third word frequencies of which are greater than the third word frequency threshold, in the at least one candidate associated word to be the associated words of the keyword. For example, the top P2 candidate associated words are top P2 candidate associated words with highest third word frequencies among all candidate associated words whose third word frequencies are greater than the third word frequency threshold, and P2 is a positive integer.

For example, in a case of determining that a candidate associated word is an associated word of the keyword, an association relationship between the associated word and the keyword may be established. An associated word group may include a keyword, associated word(s), and the association relationship between the associated word(s) and the keyword.

For example, associated words of a keyword include near-synonyms of the keyword.

It should be noted that, detailed descriptions of the functions of the question extension device 703 and the associated word acquisition device 706 can be referred to the relevant descriptions in an embodiment of a method for question-and-answer service, and detailed descriptions of the preset question group, the preset answer, the associated word group, the extended question group, and the like can also be referred to the relevant descriptions in the embodiment of the method for question-and-answer service. The repeated portions are omitted here.

For example, as shown in FIG. 5, the question-and-answer service system 70 further includes a model training device 709. The model training device 709 includes a question-and-answer prediction model 7091. For example, the detailed descriptions of the question-and-answer prediction model 7091 can be referred to the related descriptions in an embodiment of a method for question-and-answer service.

For example, the model training device 709 may communicate with the preset question-and-answer device 700 via a network or a system bus, thereby obtaining training data from the preset question-and-answer device 700.

For example, the model training device 709 is configured to extract first training data and second training data from the preset question group, the preset answer and the extended question group, and set a similarity between the first training data and the second training data as a target similarity; and train an initial question-and-answer prediction model so as to obtain the question-and-answer prediction model 7091 according to the first training data, the second training data and the target similarity.

For example, when at least one of the first training data and the second training data includes an extended question in an extended question group, the target similarity is a first similarity threshold in this case. For another example, when the first training data can include a preset question in a preset question group or a preset answer, and the second training data can include a preset question in the preset question group or a preset answer, the target similarity is a second similarity threshold in this case.

For example, the first similarity threshold is less than the second similarity threshold. Therefore, in a process of question-and-answer service, preset questions in the preset question group can be adopted preferentially, so as to improve the accuracy of outputted answers. In an example, the first similarity threshold may be, for example, 0.8, and the second similarity threshold may be 1.

It should be noted that, detailed descriptions of a training process of the question-and-answer prediction model 7091, the first training data, the second training data, the first similarity threshold and the second similarity threshold can be referred to the relevant descriptions in embodiments of the method for question-and-answer service, and detailed are omitted here.

For example, as shown in FIG. 5, the question-and-answer service system 70 may further include a question-and-answer service device 712. The question-and-answer service device 712 is configured to receive a question request, and to transmit the question request to the model training device 709. The model training device 709 is also configured to process the question request by using the question-and-answer prediction model 7091 obtained by training so as to obtain an answer to the question request, and to transmit the answer to the question request to the question-and-answer service device 712. The question-and-answer service device 712 is also configured to output the answer to the question request.

For example, the question-and-answer service device 712 may include an input device and an output device.

For example, the question-and-answer service device 712 may receive question requests from web websites or other remote clients by wireless information transmission technologies such as infrared, radio, microwave and so on.

For example, the question-and-answer service device 712 and the model training device 709 may communicate via a system bus, a network, or the like.

It should be noted that, detailed descriptions about the question-and-answer prediction model 7091, the input device and the output device can also be referred to the relevant descriptions in the embodiments of a method for question-and-answer service.

At least an embodiment of the present disclosure further provides a storage medium. The storage medium stores computer instructions which are adapted to be executed by a processor. When the computer instructions are executed by the processor, one or more steps in a method for question-and-answer service as described above may be performed, thereby achieving various functions.

For example, the storage medium may include an arbitrary combination of one or more computer program products. The computer program products may include various forms of computer-readable storage media, such as volatile memory and/or non-volatile memory. The volatile memory may include, for example, a random access memory (RAM) and/or a cache or the like. The non-volatile memory may include, for example, a read only memory (ROM), a hard disk, an erasable programmable read only memory (EPROM), a portable compact disc-read only memory (CD-ROM), a USB memory, a flash memory, and the like. Various application, various data such as the preset question group, the preset answer, the extended question group, and the associated word group, and various data used and/or generated by the applications, can also be stored in the computer-readable storage medium, and the like, may also be stored in the computer-readable storage medium.

For the present disclosure, the following statements should be noted:

(1) The accompanying drawings involve only the structure(s) in connection with the embodiment(s) of the present disclosure, and other structure(s) can be referred to common design(s);

(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A method for question-and-answer service, comprising:
   determining a keyword from an initial question group and a corresponding initial answer, wherein the initial question group comprises at least one initial question;
   wherein determining the key word from the initial question group and the corresponding initial answer comprises:
      obtaining a question word set comprising at least one candidate keyword from the initial question group, and obtaining an answer word set comprising the at least one candidate keyword from the initial answer; and
      determining the keyword from the at least one candidate keyword comprised in the question word set according to at least one first word frequency of the at least one candidate keyword in the question word set and at least one second word frequency of the at least one candidate keyword in the answer word set;

wherein determining the keyword from the at least one candidate keyword comprised in the question word set according to at least one first word frequency of the at least one candidate keyword in the question word set and at least one second word frequency of the at least one candidate keyword in the answer word set comprises:

determining that a candidate keyword is the keyword when a first word frequency of the candidate keyword is less than or equal to a first word frequency threshold and a second word frequency of the candidate keyword is greater than or equal to a second word frequency threshold;

wherein the first word frequency indicates a ratio of a quantity of times the candidate keyword appearing in the question word set to a quantity of all question words in the question word set, and the second word frequency represents a ratio of a quantity of times the candidate keyword appearing in the answer word set to a quantity of all answer words in the answer word set;

obtaining an associated word group of the keyword, the associated word group comprising at least one associated word of the keyword; and wherein obtaining a question word set comprising at least one candidate keyword from the initial question group, and obtaining an answer word set comprising the at least one candidate keyword from the initial answer, comprises:

using natural language processing technique to perform a word segmentation processing on the initial question group to obtain a question word-segmentation group, and using the natural language processing technique to perform a word segmentation processing on the initial answer to obtain an answer word-segmentation group; and processing the answer word-segmentation group to obtain the answer word set and processing the question word-segmentation group to obtain the question word set;

generating an extended question group comprising at least one extended question by using the associated word group of the keyword.

2. The method according to claim 1, wherein obtaining the associated word group of the keyword comprises:

obtaining at least one candidate associated word of the keyword from a network;

according to a word frequency of a candidate associated word of the at least one candidate associated word in the question word set and a word frequency of the candidate associated word in the answer word set, determining a third word frequency of the candidate associated word; and determining the at least one associated word of the keyword from the at least one candidate associated word according to the third word frequency of the candidate associated word.

3. The method according to claim 2, wherein determining the at least one associated word of the keyword from the at least one candidate associated word according to the third word frequency of the candidate associated word comprises:

determining that candidate associated words having third word frequencies being greater than a third word frequency threshold in the at least one candidate associated word are the at least one associated word of the keyword; or determining top P1 candidate associated words with top P1 third word frequencies in the at least one candidate associated word to be the at least one associated word of the keyword, P1 being a positive integer; or determining, in the at least one candidate associated word, top P2 candidate associated words with top P2 third word frequencies in candidate associated words whose third word frequencies are greater than the third word frequency threshold to be the at least one associated word of the keyword, the top P2 candidate keywords being top P2 candidate keywords with top P2 third word frequencies among the at least one candidate keyword, and P2 being a positive integer.

4. The method according to claim 1, further comprising, extracting first training data and second training data from the initial question group, the initial answer and the extended question group, and setting a similarity between the first training data and the second training data as a target similarity; and training an initial question-and-answer prediction model to obtain a question-and-answer prediction model according to the first training data, the second training data and the target similarity.

5. The method according to claim 4, wherein when at least one of the first training data and the second training data comprises an extended question in the extended question group, the target similarity is a first similarity threshold; and when the first training data comprises an initial question in the initial question group or the initial answer, and the second training data comprises an initial question in the initial question group or the initial answer, the target similarity is a second similarity threshold;

the first similarity threshold is less than the second similarity threshold.

6. The method according to claim 4, further comprising:

receiving a question request;

processing the question request by using the question-and-answer prediction model obtained by training, obtaining an answer to the question request; and outputting the answer to the question request.

7. The method according to claim 4, wherein training an initial question-and-answer prediction model to obtain a question-and-answer prediction model according to the first training data, the second training data and the target similarity comprises:

processing the first training data and the second training data by using the question-and-answer prediction model to obtain a predictive similarity; and comparing the predictive similarity and the target similarity, and modifying parameters of the question-and-answer prediction model according to the a comparison result, to obtain the question-and-answer prediction model.

8. A non-transitory computer readable storage medium, storing computer instructions which are adapted to be executed by a processor, wherein when the computer instructions are executed by the processor, the method for question-and-answer service according to claim 1 be performed.

9. The method according to claim 1, wherein generating an extended question group comprising at least one extended question by using the associated word group of the keyword comprises:

replacing the keyword in the initial question group with the at least one associated word of the keyword, to generate the extended question group comprising the at least one extended question.

10. A question-and-answer service system, comprising: a question extension device and an associated word acquisition device, wherein
the question extension device is configured to:
determine a keyword from an initial question group and a corresponding initial answer, the initial question group comprising at least one initial question;
the associated word acquisition device is configured to:
obtain an associated word group of the keyword, the associated word group comprising at least one associated word of the keyword;
the question extension device is also configured to generate an extended question group comprising at least one extended question by using the associated word group of the keyword;
wherein the question extension device is also configured to:
obtain a question word set comprising at least one candidate keyword from the initial question group, and obtain an answer word set comprising the at least one candidate keyword from the initial answer; and
determine the keyword from the at least one candidate keyword comprised in the question word set according to at least one first word frequency of the at least one candidate keyword in the question word set and at least one second word frequency of the at least one candidate keyword in the answer word set;
when performing an operation of obtaining a question word set comprising at least one candidate keyword from the initial question group, and obtaining an answer word set comprising the at least one candidate keyword from the initial answer, the question extension device is configured to:
use natural language processing technique to perform a word segmentation processing on the initial question group to obtain a question word-segmentation group, and use the natural language processing technique to perform a word segmentation processing on the initial answer to obtain an answer word-segmentation group; and process the answer word-segmentation group to obtain the answer word set and process the question word-segmentation group to obtain the question word set;
wherein the question extension device is also configured to determine that a candidate keyword is the keyword when a first word frequency of the candidate keyword is less than or equal to a first word frequency threshold and a second word frequency of the candidate keyword is greater than or equal to a second word frequency threshold;
wherein the first word frequency indicates a ratio of a quantity of times the candidate keyword appearing in the question word set to a quantity of all question words in the question word set, and the second word frequency represents a ratio of a quantity of times the candidate keyword appearing in the answer word set to a quantity of all answer words in the answer word set.

11. The question-and-answer service system according to claim 10, wherein the associated word acquisition device is configured to:
obtain at least one candidate associated word of the keyword from a network;
according to a word frequency of a candidate associated word of the at least one candidate associated word in the question word set and a word frequency of the candidate associated word in the answer word set, determine a third word frequency of the candidate association word; and
determine the at least one associated word of the keyword from the at least one candidate associated word according to the third word frequency of the candidate associated word.

12. The question-and-answer service system according to claim 11, wherein the associated word acquisition device is configured to:
determine that candidate associated words having third word frequencies being greater than a third word frequency threshold in the at least one candidate associated word are the at least one associated word of the keyword; or
determine top P1 candidate associated words with top P1 third word frequencies in the at least one candidate associated word to be the at least one associated word of the keyword, P1 being a positive integer; or
determine, in the at least one candidate associated word, top P2 candidate associated words with top P2 third word frequencies in candidate associated words whose third word frequencies are greater than the third word frequency threshold to be the at least one associated word of the keyword, the top P2 candidate keywords being top P2 candidate keywords with top P2 third word frequencies among the at least one candidate keyword, and P2 being a positive integer.

13. The question-and-answer service system according to claim 10, further comprising a model training device,
wherein the model training device is configured to train a question-and-answer prediction model,
the model training device is configured to:
extract first training data and second training data from the initial question group, the initial answer and the extended question group, and set a similarity between the first training data and the second training data as a target similarity; and
train the question-and-answer prediction model according to the first training data, the second training data and the target similarity.

14. The question-and-answer service system according to claim 13, wherein
when at least one of the first training data and the second training data comprises an extended question in the extended question group, the target similarity is a first similarity threshold;
when the first training data comprises an initial question in the initial question group or the initial answer, and the second training data comprises an initial question in the initial question group or the initial answer, the target similarity is a second similarity threshold;
the first similarity threshold is less than the second similarity threshold.

15. The question-and-answer service system according to claim 13, further comprising a question-and-answer service device, wherein
the question-and-answer service device is configured to receive a question request;
the model training device is configured to process the question request by using the question-and-answer prediction model obtained by training, and obtain an answer to the question request;

the question-and-answer service device is also configured to output the answer to the question request.

16. The question-and-answer service system according to claim 10, wherein the at least one associated word of the keyword comprises a synonym of the keyword.

\* \* \* \* \*